UNITED STATES PATENT OFFICE.

JOHN C. BAILEY, OF JERSEY CITY, N. J., ASSIGNOR OF ONE-HALF OF HIS RIGHT TO WILLIAM A. THORP, OF PHILADELPHIA, PA.

LINIMENT.

SPECIFICATION forming part of Letters Patent No. 223,306, dated January 6, 1880.

Application filed September 29, 1879.

*To all whom it may concern:*

Be it known that I, JOHN C. BAILEY, of Jersey City, State of New Jersey, have invented a new and useful Compound for the Prevention and Cure of Poison Produced by the Sting of Insects, such as mosquitoes, bees, and the like, of which the following is a specification.

My invention consists in a compound, composition, or the like formed by mixing alcohol, oil of pennyroyal, alum, onion-juice, and garlic-juice.

To prepare my compound, I mix one quart of alcohol with one ounce of oil of pennyroyal, and after the oil is cut I add one ounce of pulverized alum, four ounces of onion-juice, four ounces of garlic-juice, and thoroughly mix these ingredients.

The compound is applied direct to the sting by bandage, rubbing, or other fit means.

I am aware that the juice of the onion and of garlic has heretofore been applied as topical remedies, and I therefore lay no broad claim to them.

Having thus described my invention, I claim and desire to secure by Letters Patent of the United States—

The herein-described composition of matter, being an antidote for the poison of bees or other insects, which consists of alcohol, oil of pennyroyal, alum, onion-juice, and garlic-juice, combined in about the proportions set forth.

In testimony whereof I have hereunto signed my name this 22d day of September, A. D. 1879.

JNO. C. BAILEY.

In presence of—
J. A. ROMEYN,
C. B. THURSTON.